United States Patent
Shannon et al.

(10) Patent No.: US 12,007,896 B2
(45) Date of Patent: Jun. 11, 2024

(54) APPARATUSES, SYSTEMS, AND METHODS FOR CONFIGURING COMBINED PRIVATE AND SHARED CACHE LEVELS IN A PROCESSOR-BASED SYSTEM

(71) Applicant: Ampere Computing LLC, Santa Clara, CA (US)

(72) Inventors: Richard James Shannon, Portland, OR (US); Stephan Jean Jourdan, Santa Clara, CA (US); Matthew Robert Erler, Portland, OR (US); Jared Eric Bendt, Hillsboro, OR (US)

(73) Assignee: Ampere Computing LLC, Santa Clara, CA (US)

( * ) Notice: Subject to any disclaimer, the term of this patent is extended or adjusted under 35 U.S.C. 154(b) by 0 days.

(21) Appl. No.: 17/834,682

(22) Filed: Jun. 7, 2022

(65) Prior Publication Data

US 2022/0398196 A1    Dec. 15, 2022

Related U.S. Application Data (60) Provisional application No. 63/208,730, filed on Jun. 9, 2021.

(51) Int. Cl.
*G06F 12/084* (2016.01)

(52) U.S. Cl.
CPC ........ *G06F 12/084* (2013.01); *G06F 2212/60* (2013.01)

(58) Field of Classification Search
None
See application file for complete search history.

(56) References Cited

U.S. PATENT DOCUMENTS

| | | |
|---|---|---|
| 5,875,464 A | 2/1999 | Kirk |
| 7,287,254 B2 | 10/2007 | Miller et al. |

(Continued)

FOREIGN PATENT DOCUMENTS

| | | |
|---|---|---|
| CN | 107870871 A | 4/2018 |
| JP | 2001282617 A | 10/2001 |

(Continued)

OTHER PUBLICATIONS

Arm, "AMBA 5 CHI Architecture Specification," ARM IHI 0050E.b, Aug. 16, 2021, ARM Limited, 508 page.

(Continued)

*Primary Examiner* — Charles J Choi
(74) *Attorney, Agent, or Firm* — Withrow & Terranova, PLLC (57) ABSTRACT

Apparatuses, systems, and methods for configuring combined private and shared cache levels in a processor-based system. The processor-based system includes a processor that includes a plurality of processing cores each including execution circuits which are coupled to respective cache(s) and a configurable combined private and shared cache, and which may receive instructions and data on which to perform operations from the cache(s) and the combined private and shared cache. A shared cache portion of each configurable combined private and shared cache can be treated as an independently-assignable portion of the overall shared cache, which is effectively the shared cache portions of all of the processing cores. Each independently-assignable portion of the overall shared cache can be associated with a particular client running on the processor as an example. This approach can provide greater granularity of cache partitioning of a shared cache between particular clients running on a processor.

17 Claims, 6 Drawing Sheets

(56) References Cited

U.S. PATENT DOCUMENTS

| | | | |
|---|---|---|---|
| 7,853,752 B1 | 12/2010 | Agarwal et al. | |
| 8,543,769 B2* | 9/2013 | Rajamony | G06F 12/084 711/134 |
| 2007/0143546 A1 | 6/2007 | Narad | |
| 2009/0249094 A1 | 10/2009 | Marshall et al. | |
| 2011/0161943 A1 | 6/2011 | Bellows et al. | |
| 2012/0198172 A1 | 8/2012 | Lin et al. | |
| 2013/0138891 A1* | 5/2013 | Chockler | G06F 12/0893 711/E12.022 |
| 2013/0205119 A1* | 8/2013 | Rajwar | G06F 11/28 712/208 |
| 2014/0040556 A1* | 2/2014 | Walker | G06F 9/5016 711/130 |
| 2014/0201452 A1 | 7/2014 | Meredith | |
| 2019/0065374 A1 | 2/2019 | Hower et al. | |

FOREIGN PATENT DOCUMENTS

| | | |
|---|---|---|
| WO | 2020256610 A1 | 12/2020 |
| WO | 2021066844 A1 | 4/2021 |

OTHER PUBLICATIONS

Tsai, W.-Y, et al., "A Port-Configuration Assisted NIC IRQ Affinitization Scheme for Multi-Core Packet Forwarding Applications," 2012 IEEE Global Communications Conference (GLOBECOM), Dec. 3-7, 2012, Anaheim, CA, USA, IEEE, 6 pages.
International Search Report and Written Opinion for International Patent Application No. PCT/US2022/032694, dated Sep. 21, 2022, 15 pages.
International Search Report and Written Opinion for International Patent Application No. PCT/US2022/032697, dated Sep. 29, 2022, 35 pages.
International Search Report and Written Opinion for International Patent Application No. PCT/US2022/032701, dated Sep. 22, 2022, 17 pages.
Non-Final Office Action for U.S. Appl. No. 17/834,661, dated Apr. 20, 2023, 11 pages.
Non-Final Office Action for U.S. Appl. No. 17/834,697, dated Jun. 20, 2023, 12 pages.
Written Opinion for International Patent Application No. PCT/US2022/032694, dated Apr. 26, 2023, 6 pages.
International Preliminary Report on Patentability for International Patent Application No. PCT/US2022/032697, dated May 15, 2023, 19 pages.
Notice of Allowance for U.S. Appl. No. 17/834,661, dated Sep. 5, 2023, 13 pages.
International Preliminary Report on Patentability for International Patent Application No. PCT/US2022/032694, dated Aug. 30, 2023, 17 pages.
Notice of Allowance for U.S. Appl. No. 17/834,697, mailed Nov. 14, 2023, 12 pages.

* cited by examiner

| | C0 | C1 | C2 | C3 | C4 | C5 | C6 | C7 | C8 | C9 | C10 | C11 |
|---|---|---|---|---|---|---|---|---|---|---|---|---|
| 304 CLIENT_A_ALLOC_BITMASK | 1 | 1 | 1 | 1 | 0 | 0 | 0 | 0 | 0 | 1 | 0 | 1 |
| 306 CLIENT_B_ALLOC_BITMASK | 0 | 0 | 0 | 0 | 1 | 1 | 0 | 0 | 0 | 1 | 0 | 1 |
| 308 CLIENT_C_ALLOC_BITMASK | 0 | 0 | 0 | 0 | 0 | 0 | 1 | 1 | 0 | 1 | 0 | 1 |
| 310 CLIENT_D_ALLOC_BITMASK | 0 | 0 | 0 | 0 | 0 | 0 | 0 | 0 | 1 | 1 | 1 | 1 |

# APPARATUSES, SYSTEMS, AND METHODS FOR CONFIGURING COMBINED PRIVATE AND SHARED CACHE LEVELS IN A PROCESSOR-BASED SYSTEM

PRIORITY CLAIM

The present application claims priority to U.S. Provisional Patent Application Ser. No. 63/208,730, filed on Jun. 9, 2021, and entitled "APPARATUS, SYSTEM, AND METHOD FOR CONFIGURING COMBINED PRIVATE AND SHARED CACHE LEVELS IN A PROCESSOR-BASED SYSTEM," the contents of which are incorporated herein by reference in its entirety.

BACKGROUND

I. Field of the Disclosure

The technology of the disclosure relates generally to configuring cache resources in a processor, and specifically to configuring combined private and shared cache levels in a processor.

II. Background

In order to provide low-latency retrieval of instructions and/or data (as compared to the latency of transactions to a main memory system such as a double data rate (DDR) memory, for example), microprocessors may conventionally include one or more levels of cache memory resources. These cache memory resources may be arranged in a hierarchical manner—for example, a microprocessor may have level 0 (L0), level 1 (L1), level 2 (L2), and level 3 (L3) caches, of which L0 may be the relative smallest and lowest latency, with the other caches increasing in size and latency up through the L3 cache, which may be the largest but with the longest latency compared to the other caches. In some aspects, one or more of the levels of cache hierarchy may have split instruction and data caches (e.g., the L0 cache level may comprise split L0 instruction and L0 data caches), whereas other levels of the cache hierarchy may contain both instructions and data. Some levels of the cache hierarchy may be "private" to the microprocessor or, in the case of a multi-core microprocessor, may be private to one or more individual core(s) (meaning that such private caches are only visible and accessible to the associated microprocessor or individual core(s)). Other levels of the cache hierarchy, despite being physically located with a particular microprocessor, may be shared across and usable by one or more other microprocessors in a system.

In order to efficiently utilize the available computing resources of a microprocessor, it may be desirable to run multiple applications or virtual machines on the same microprocessor. With respect to shared levels of the cache hierarchy, particularly in microprocessors with large numbers of individual cores, it is further desirable to control the ability of a particular client (e.g., a specific application or virtual machine running on the microprocessor) to consume more than its share of shared cache resources. Among other reasons, this is because allowing a single client to consume more than its share of resources can result in unequal or unpredictable performance of other clients on that microprocessor. In the case of cloud computing, particular clients may have associated service level agreements (i.e., guarantees of a particular level of performance) that cannot be violated, and those service level agreements could be jeopardized if a particular client consumes an unequal portion of shared cache resources leading to unequal or unpredictable performance of other clients as described above.

In order to address this difficulty, one conventional solution has been to allocate one or more specific ways of the shared cache to individual clients. Although this approach provides some level of equalization of the shared resources consumed by individual clients, it still involves significant downsides. For example, it is naturally limited by the number of ways of the shared cache—(e.g., if the shared L3 cache has 16 ways, it can only be divided up between 16 individual clients). Further, as the ways themselves are used to perform allocations into the cache, linking individual way(s) with individual client(s) can reduce the effective associativity of the cache with respect to each individual client, which can increase the number of evictions from the shared cache and concomitantly reduce performance. Where portions of the shared cache are distributed across a shared interconnect, there may be an increased potential for side-channel attacks, due to increased interconnect traffic associated with the increased number of cache transactions.

SUMMARY OF THE DISCLOSURE

Aspects disclosed in the detailed description include apparatuses, systems, and methods for configuring combined private and shared cache levels in a processor-based system. In an exemplary aspect, the processor-based system includes a processor that includes a plurality of processing cores. The processing cores each includes execution circuits which are coupled to respective low level cache(s) and a configurable combined private and shared cache, and which may receive instructions and data on which to perform operations from the low level cache(s) and the combined private and shared cache. From the perspective of the processor, a shared cache portion of each configurable combined private and shared cache of each processing core can be treated as an independently-assignable portion of the overall shared cache, which is effectively the shared cache portions of all of the processing cores. Each independently-assignable portion of the overall shared cache can be associated with a particular client running on the processor (e.g., by associating a partition identifier with each client that would associate a portion of the shared cache with that client, or by associating an address partition with a particular set of shared cache portions). Particularly in systems with high processing core counts as an example, this approach can provide greater granularity of cache partitioning compared to the conventional approach of partitioning a shared cache between particular clients running on a conventional processor.

In this regard, in one exemplary aspect, a processor-based system is provided. The processor-based system comprises a first processing core including a configurable combined private and shared cache, the configurable combined private and shared cache configured to include a shared cache portion. The shared cache portion is configured to be associated with a first client application.

In another exemplary aspect, a processor-based system is provided. The processor-based system comprises a means for processing including means for storing information, the means for storing information configured to include a configurable shared cache portion, the shared cache portion configured to be associated with a first client application.

In yet another exemplary aspect, a method of associating a shared cache portion of a cache is provided. The method comprises establishing a shared cache portion of a configurable combined private and shared cache in a first processing core. The method also comprises associating the shared cache portion of the configurable combined private and shared cache of the first processing core with a first client application.

In yet another exemplary aspect, a non-transitory computer-readable medium stores computer executable instructions which, when executed by a processor, cause the processor to selectively allocate an entry in the shared cache portion based on a capacity limit.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include apparatuses, systems, and methods for configuring combined private and shared cache levels in a processor-based system. In an exemplary aspect, the processor-based system includes a processor that includes a plurality of processing cores. The processing cores each includes execution circuits which are coupled to respective low level cache(s) and a configurable combined private and shared cache, and which may receive instructions and data on which to perform operations from the low level cache(s) and the combined private and shared cache. From the perspective of the processor, a shared cache portion of each configurable combined private and shared cache of each processing core can be treated as an independently-assignable portion of the overall shared cache, which is effectively the shared cache portions of all of the processing cores. Each independently-assignable portion of the overall shared cache can be associated with a particular client running on the processor (e.g., by associating a partition identifier with each client that would associate a portion of the shared cache with that client, or by associating an address partition with a particular set of shared cache portions). Particularly in systems with high processing core counts as an example, this approach can provide greater granularity of cache partitioning compared to the conventional approach of partitioning a shared cache between particular clients running on a conventional processor.

Figure 1:
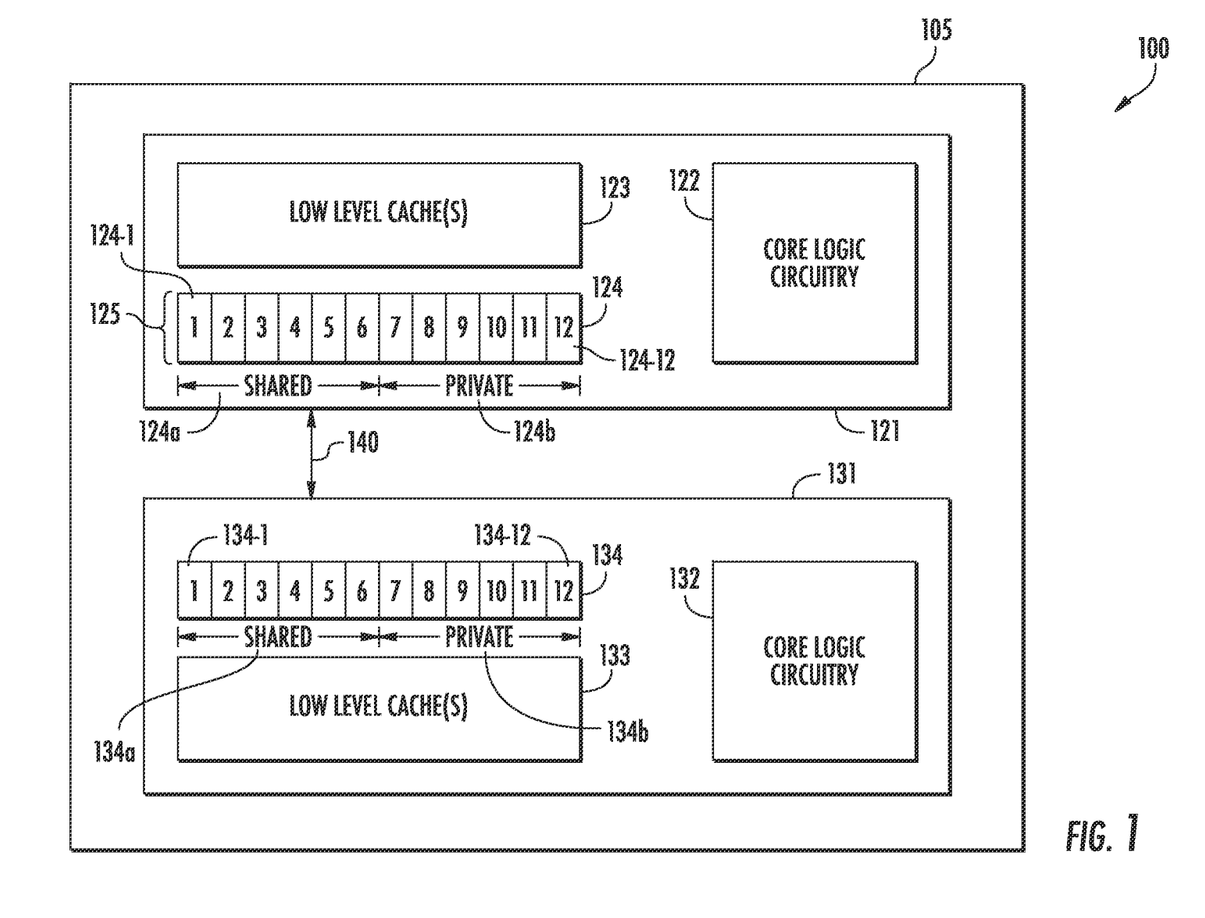
FIG. 1 is a block diagram of an exemplary system for configuring a combined private and share cache that may be partitionable on a per-core basis in a processor-based system.

In this regard, FIG. 1 is a block diagram of a processor-based system 100 including a processor 105 (e.g., a microprocessor) including a configurable combined private and shared cache, as will be discussed in greater detail herein. The processor 105 includes a first processing core 121 and a second processing core 131 in this example. The processing cores 121, 131 may also be referred to as "processor cores." The first processing core 121 further includes execution circuits 122, also called core logic circuitry 122, which are coupled to low level cache(s) 123 and a configurable combined private and shared cache 124, and which may receive instructions and data on which to perform operations from the low level cache(s) 123 and the combined private and shared cache 124. The low level cache(s) 123 may include L0 and L1 caches (whether split data and instruction caches, or combined), and the configurable combined private and shared cache 124 may include a private L2 and a shared L3 cache, in an aspect. The second processing core 131 further includes execution circuits 132, also called core logic circuitry 132, which are coupled to low level cache(s) 133 and a configurable combined private and shared cache 134, and which may receive instructions and data on which to perform operations from the low level cache(s) 133 and the combined private and shared cache 134. The low level cache(s) 133 may include L0 and L1 caches (whether split data and instruction caches, or combined), and the configurable combined private and shared cache 134 may include a private L2 and a shared L3 cache, in an aspect. The first processing core 121 and the second processing core 131 may communicate over an interconnect 140.

In this illustrated exemplary aspect, the configurable combined private and shared cache 124 functions as a physically combined but logically separated private L2 and shared L3 cache, illustrated as a shared L3 portion 124a and private L2 portion 124b, and includes a plurality of cache ways 125-1 through 125-12. Because the private L2 and shared L3 portions are included in the same physical cache structure, it is possible to change the relative amounts of the combined private and shared cache 124 that are devoted to private L2 and shared L3 portions respectively. To set the sizes of the shared L3 portion 124a and the private L2 portion 124b, a configuration is programmed or set in the configurable combined private and shared cache 124 which allocates a first portion of the cache ways 125-1 to 125-12 to the shared L3 portion 124a, and a second portion of the cache ways 125-1 to 125-12 to the private L2 portion 124b. The configuration of the combined private and shared cache 124 is dynamic and may be changed during operation of the processor 105, for example as part of a firmware configuration, by boot-time configuration, during system resets, during operation of the processor 105 when the contents of all caches are to be flushed or invalidated, or at other times and in other manners that will occur to those having skill in the art. The configuration may be changed over time, as the processor-based system 100 may from time to time have different applications or virtual machines allocated to run on the processor 105.

For example, at a first time, the shared L3 portion 124a may include cache ways 125-1 to 125-6, while the private L2 portion 124b may include cache ways 125-7 to 124-12. At a later time, when the processor 105 is re-booted, for example, the configuration may be changed such that the shared L3 portion 124 may include cache ways 125-1 to 125-8, while the private L2 portion 124b may include cache ways 125-9 to 125-12. In some aspects, the configurable combined private and shared cache 124 may allow complete flexibility regarding the sizes of the shared L3 portion 124a and the private L2 portion 124b (i.e., each of the portions may be set to a size anywhere from zero cache ways to all cache ways of the configurable combined private and shared cache 124), whereas in other aspects, lower and/or upper limits on the size of either or both the shared L3 portion 124a and the private L2 portion 124b may be established (e.g., the private L2 portion 124b may not be smaller than two cache ways, and/or the shared L3 portion 124a may not be smaller than four cache ways). Those having skill in the art will understand that the above aspects are included by way of illustration and not by limitation, and that other configurations of the shared L3 portion 124a and the private L2 portion 124b are possible.

In the illustrated aspect, the configurable combined private and shared cache 134 may function similarly to the configurable combined private and shared cache 124, and as such may also include a plurality of cache ways 134-1 through 134-12. The configurable combined private and shared cache 134 may share a configuration with the configurable combined private and shared cache 124, or may be configured differently, depending on any requirements of an associated system architecture, design considerations, or other design choices as will be apparent to those having skill in the art. Further, although the illustrated processor-based system 100 shows only the first processing core 121 and the second processing core 131, it will be appreciated that the processor 105 may contain any number of processing cores which may function similarly to the first processing core 121 and the second processing core 131 with respect to their associated configurable combined private and shared caches 124 and 134.

In one aspect, the processor 105 may include sixty-four (64) processing cores (including the first processing core 121 and the second processing core 131 shown in FIG. 1), for example. From the perspective of the processor 105 in FIG. 1, the shared cache portion of each configurable combined private and shared cache of each processing core (e.g., processing cores 121, 131) may be treated as an independently-assignable portion of the overall shared L3 cache (e.g., in the lower level caches 123, 133) (which is effectively the shared L3 portions of all of the processing cores, such as the shared L3 portion 124a and the shared L3 portion 134a), which may be associated with a particular client running on the processor 105 (e.g., by associating a partition identifier with each client that would associate a portion of the shared L3 cache with that client, or by associating an address partition with a particular set of shared L3 cache portions). Particularly in systems with high processing core counts, this approach may provide greater granularity of cache partitioning compared to the conventional approach of partitioning a shared cache between particular clients running on a conventional processor. In the above-described aspect, where the processor 105 includes sixty-four (64) processing cores, and where the shared L3 portions (e.g., shared L3 portions 124a, 134a) of those processing cores (e.g., processing cores 121, 131) are configured to use eight (8) of the available twelve (12) cache ways of their respective configurable combined private and shared caches, the granularity of cache partitioning available per client increases by a factor of eight (8) in this example compared to a cache memory system which allows partitioning only on a per-cache way basis (since, in that configuration, the shared L3 portion could be partitioned only into 8 segments). Further, since the shared L3 portion (e.g., shared L3 portions 124a, 134a of each processing core (e.g., processing cores 121, 131) is not further subdivided by individual cache ways, the associativity of the shared L3 portion is not reduced, which mitigates the issue of increased conflict-based cache evictions from the shared L3 portion where the shared L3 portion is partitioned between particular clients by cache ways instead of on a per-processing core basis.

Figure 2:
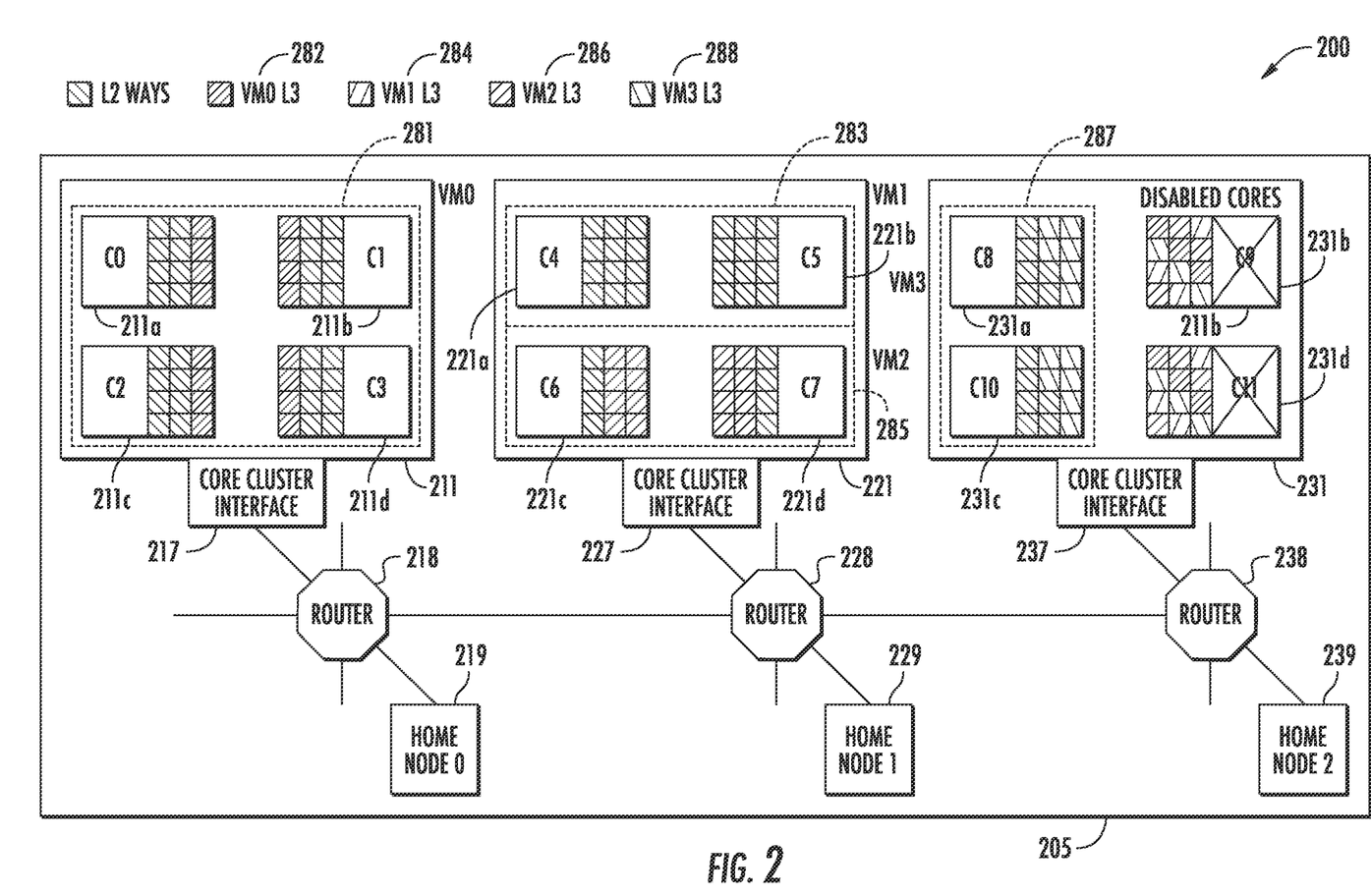
FIG. 2 is a block diagram of another exemplary system including configurable combined private and shared caches that may be partitionable on a per-core basis in a processor-based system.

In this regard, FIG. 2 is a block diagram of a processor-based system 200 including a processor 205 which includes combined private and shared caches that may be partitionable on a per-processing core basis as described above with respect to FIG. 1. The processor 205 in FIG. 2 includes a first processing cluster 211, which is coupled to a first core cluster interface 217 and a first router 218. A first home node 219 is coupled to the first router 218. The processor 205 further includes a second processing cluster 221, which is coupled to a second core cluster interface 227 and a second router 228. A second home node 229 is coupled to the second router 228. The processor 205 further includes a third processing cluster 231, which is coupled to a third core cluster interface 237 and a third router 238. A third home node 239 is coupled to the third router 238. The home nodes 0-2 219, 229, and 239 may manage coherency for at least a set of memory addresses of the processor-based system 200 for their associated processing clusters, which may include snooping and invalidating caches, allocating and managing the shared caches, and performing transactions with a system memory (e.g., DDR DRAM in one aspect). The routers 218, 228, and 238 may be coupled together as part of a system interconnect in order to allow the processing clusters 211, 221, and 231 to communicate and transfer instructions and data between them, and to access system memory.

The first processing cluster 211 includes four processing cores 211a-d. Each of the processing cores 211a-d includes a configurable combined private and shared cache. The second processing cluster 221 includes four processing cores 221a-d. Each of the processing cores 221a-d includes a configurable combined private and shared cache. The third processing cluster 231 includes four processing cores 231a-d, but two of the processing cores (231b and 231d) are disabled (e.g., as a result of manufacturing defects, by deliberate fusing, or other configuration methods), although their caches are still enabled and available, and may be used by particular clients running on the processor 205. The two active processing cores 231a and 231c include a configurable combined private and shared cache.

The configurable combined private and shared caches of each of the processing cores of each processing cluster may be partitioned between particular client(s) running on the processor 205 on a per-processing core basis. For example, the first processing cluster 211 may be executing a first virtual machine 281 on the processing cores 211a-d. Each of the processing cores 211a-d may have four of the available twelve (12) cache ways allocated to their shared L3 portion 282, and the shared L3 portion 282 of each of the processing cores 211a-d may be associated with the first virtual machine 281. The second processing cluster 221 may be executing a second virtual machine 283 on processing cores 221a-b, and may be executing a third virtual machine 285 on processing cores 221c-d. Processing cores 221a-b may have the size of their shared L3 portions set to zero (i.e., the second virtual machine 283 executing on processing cores 221a-b can run with acceptable performance without access to a co-located shared L3 portion). Processing cores 221c-d may have eight of the available twelve (12) cache ways allocated to their shared L3 portion 286, and the shared L3 portion 286 of each of the processing cores 221c-d may be associated with the third virtual machine 285. The third processing cluster 231 may be executing a fourth virtual machine 287 on processing cores 231a and 231c, while processing cores 231b and 231d are disabled, but have their have their caches configured as entirely shared L3 caches which can be used by clients running on the processor 205. Processing cores 231a and 231c may have six of the available twelve cache ways allocated to their shared L3 portion 288, and the shared L3 portion 288 of each of the processing cores 231a and 231c may be associated with the fourth virtual machine 287.

As explained above, in the cases of the first processing cluster 211 and the second processing cluster 221, the respective shared L3 portions of the caches of the associated processing cores (where configured to have at least one cache way available) may be associated with a single client application per core (e.g., the first virtual machine 281 on processing cores 211a-d, the second virtual machine 283 on processing cores 221a-b, and the third virtual machine 285 on processing cores 221c-d). Similarly, processing cores 231a and 231c of the third processing cluster 231 are associated with a single client application per-processing core (e.g., the fourth virtual machine 287). However, it is also possible to allow multiple clients to access the shared L3 portion on a processing core. For example, in the case of the disabled processing cores 231b and 213d of the third processing cluster 231, the entirety of each of their configurable combined private and shared caches have been configured as shared L3 portion (i.e., all twelve (12) cache ways are dedicated to the shared L3 portion), and each of the first virtual machine 281, second virtual machine 283, third virtual machine 285, and fourth virtual machine 287 are permitted to access the shared L3 portions of disabled processing cores 231b and 231d.

Those having skill in the art will recognize that the above-described shared L3 portion configurations and associations with specific clients are presented by way of illustration, and not by way of limitation, and that other mappings of clients to physical memory resources are possible. For example, in some aspects, a client running on a specific processing core or cores may be restricted to only those shared L3 portions physically present on those processing cores.

Additionally, a client or group of clients may have capacity limits regarding the percentage of total available shared cache of an associated processing core or cores that may be used, which may be enforced by altering the replacement policy of the associated shared cache. For example, in the case of the shared L3 portions of disabled processing cores 231b and 231d, the associated home node 239 may enforce a capacity limit of no more than one-third of the available shared L3 portions of disabled processing cores 231b and 231d per client. Thus, if a first virtual machine 281 has already consumed one-third of the available shared L3 portions of disabled processing cores 231b and 231d, the replacement algorithm for those shared L3 portions may be altered such that new requests to store information related to the first virtual machine 281 will replace another entry associated with the first virtual machine 281 (as opposed to a free entry, or an entry associated with another client). This new replacement algorithm may be enforced until the client which is consuming the larger share of resources evicts or invalidates enough entries in the shared L3 portions to fall below the capacity limit.

In some aspects, each client software process running on a processing core (such as the virtual machines 281, 283, 285, and 287 executing on the processing cores 211a-d, 221a-d, and 231a-d of FIG. 2) is associated with a unique client identifier (ID) value. For each client ID value, a corresponding configuration register (CR) in each home node implements a bit mask, referred to herein as a "CLIENT_ALLOC_BITMASK." Each of these bit masks control which shared L3 cache portions can be used by the client ID corresponding to that bit mask, where each bit in the bit mask represents one of the processing cores in the processor-based device. In this manner, the shared L3 cache may be partitioned into portions whereby a client software process associated with each client ID can only use certain portions.

When an L2 cache entry is evicted, the processing core issues a write back request, including the client ID associated with that L2 cache entry, to the respective home node. The home node then refers to the CLIENT_ALLOC_BITMASK associated with that client ID, and selects one of the shared L3 portions that are marked as available to that client ID (e.g., in one aspect, L3 portions that have a value of one (1) in the bit mask). In similar fashion, requests for allocating writes from a processing core or from a Direct Memory Access (DMA) device include a client ID, which the home node then uses to determine which portions of the shared L3 cache the write data can be allocated into.

Figure 3A:
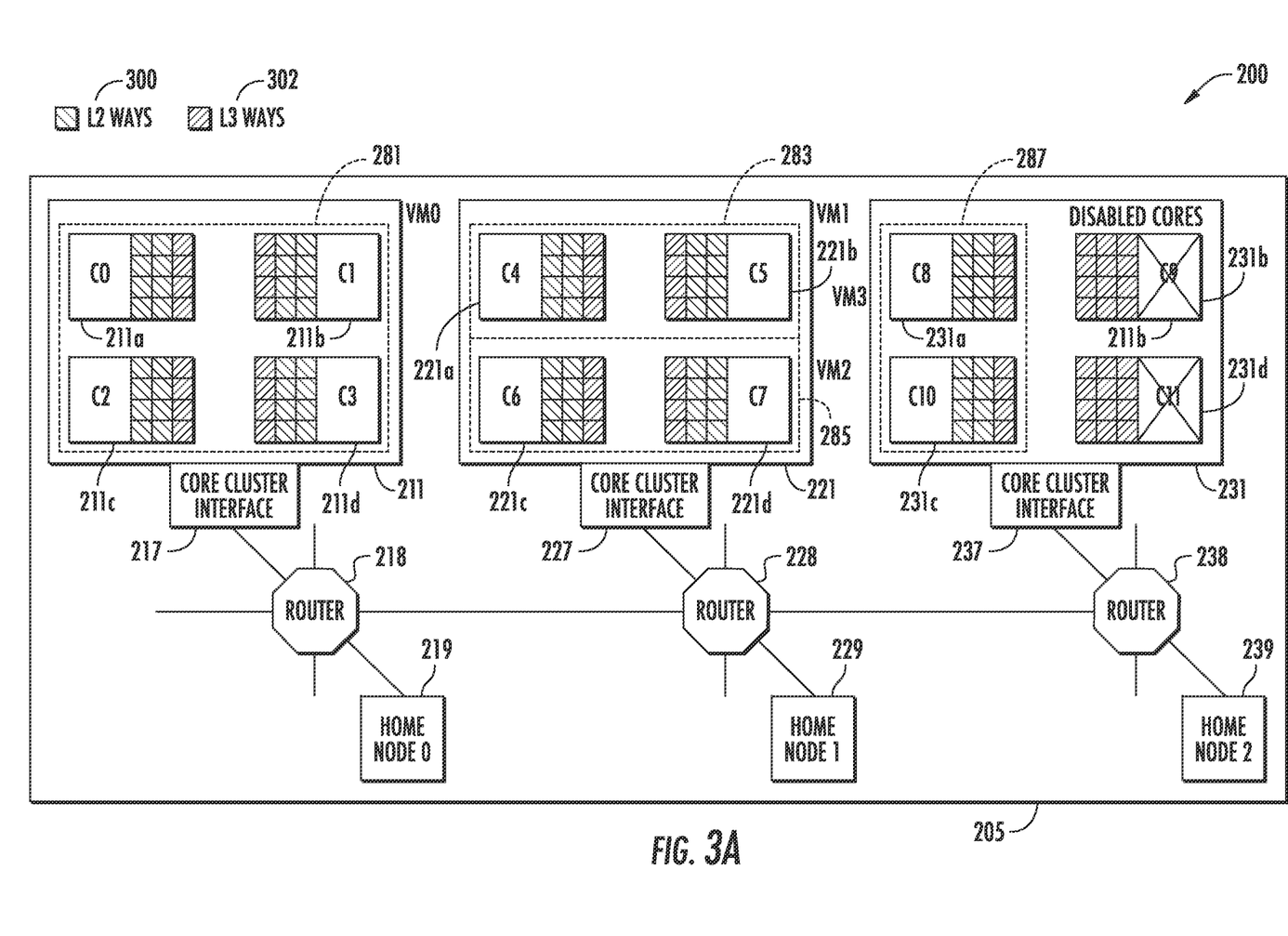
FIGS. 3A and 3B are block diagrams illustrating the use of allocation bitmasks for allocating shared caches to individual client software applications, according to some aspects.
Figure 3B:
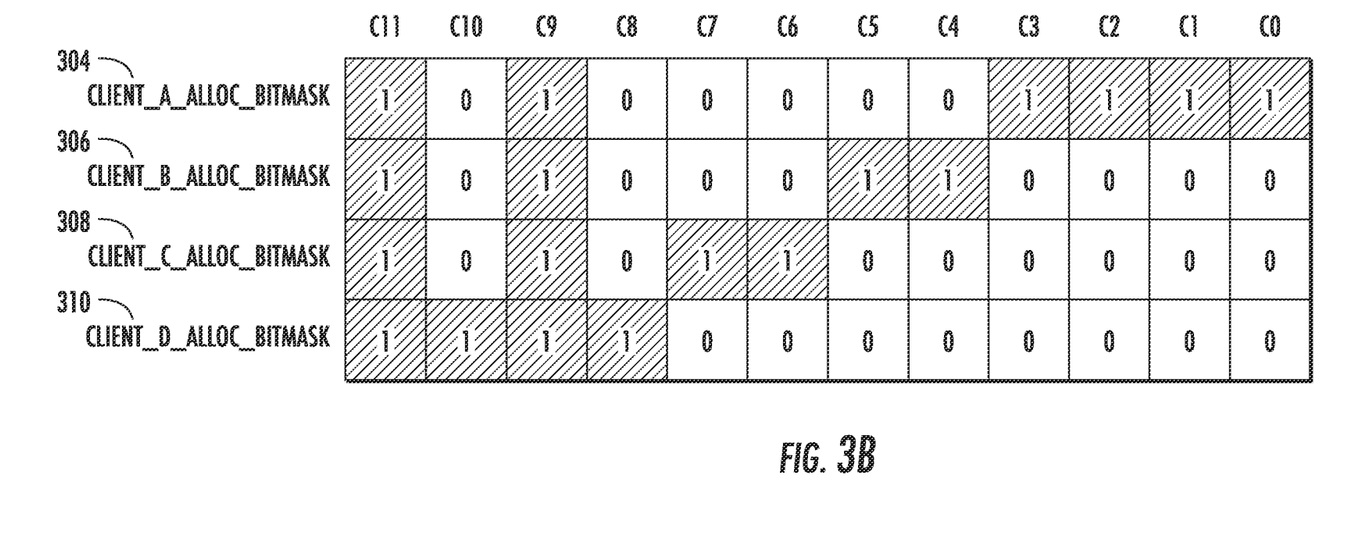

To illustrate the use of bitmasks to control which L3 cache portions can be used by each client of a plurality of clients, FIGS. 3A and 3B are provided. FIG. 3A shows the processor-based system of FIG. 2, comprising the processing cores 211a-d, the processing cores 221a-d, and the processing cores 231a-d, as well as the three (3) home nodes 219, 229, and 239. The CPU caches of the processing cores 211a-d, 221a-d, and 231a-d are configured into private L2 portions 300 and shared L3 portions 302. In particular, for the processing cores 211a-d, 221a-d, 231a, and 231c, the CPU caches are configured with eight (8) ways of private L2 cache and four (4) ways of shared L3 cache. The processing cores 231b and 231d are disabled, and their entire CPU cache is configured as shared L3 cache.

The shared L3 cache portions in FIG. 3A are partitioned using the CLIENT_ALLOC_BITMASK settings shown in FIG. 3B, which are duplicated in each of the home nodes 219, 229, and 239. It is assumed for the sake of illustration that the virtual machines 281, 283, 285, and 287 of FIGS. 2 and 3A are assigned client ID values of A, B, C, and D, respectively. Accordingly, the virtual machine 281 is associated with the CLIENT_A_ALLOC_BITMASK 304 of FIG. 3B, the virtual machine 283 is associated with the CLIENT_B_ALLOC_BITMASK 306 of FIG. 3B, the virtual machine 285 is associated with the CLIENT_C_ALLOC_BITMASK 308 of FIG. 3B, and the virtual machine 287 is associated with the CLIENT_D_ALLOC_BITMASK 310 of FIG. 3B. Each of the CLIENT_ALLOC_BITMASK settings includes a bit with a value of one (1) corresponding to each processor core in which the client software process can allocate into the shared L3 portion.

Thus, with the L3 partition settings illustrated in FIG. 3B, L2 evictions or allocating writes with a client ID value of A (i.e., operations performed by the virtual machine 281) can only be allocated into the shared L3 portions in processing cores C0-C3, C9, or C11 (i.e., the processing cores 211a-d, 231b, or 231d), as indicated by the CLIENT_A_ALLOC_BITMASK 304. Similarly, L2 evictions or allocating writes with a client ID value of B (i.e., operations performed by the virtual machine 283) can only be allocated into the shared L3 portions in processing cores C4, C5, C9, or C11 (i.e., the processing cores 221a, 221b, 231b, or 231d), as indicated by the CLIENT_B_ALLOC_BITMASK 306. L2 evictions or allocating writes with a client ID value of C (i.e., operations performed by the virtual machine 285) can only be allocated into the shared L3 portions in processing cores C6, C7, C9, or C11 (i.e., the processing cores 221c, 221d, 231b, or 231d) as indicated by the CLIENT_C_ALLOC_BITMASK 308, while L2 evictions or allocating writes with a client ID value of D (i.e., operations performed by the virtual machine 287) can only be allocated into the shared L3 portions in processing cores C8, C9, C10, or C11 (i.e., the processing cores 231a-d) as indicated by the CLIENT_D_ALLOC_BITMASK 310. Note that the shared L3 cache in the disabled processing cores 231b and 231d is available for use by all clients. By using this approach to cache partitioning, a client software process can be restricted to using only the shared L3 portions that correspond to the processing cores that the client software process itself is running on. This L3 partitioning mechanism also provides isolation between clients running on the same system, as they are not sharing the same L3 portions.

Figure 4:
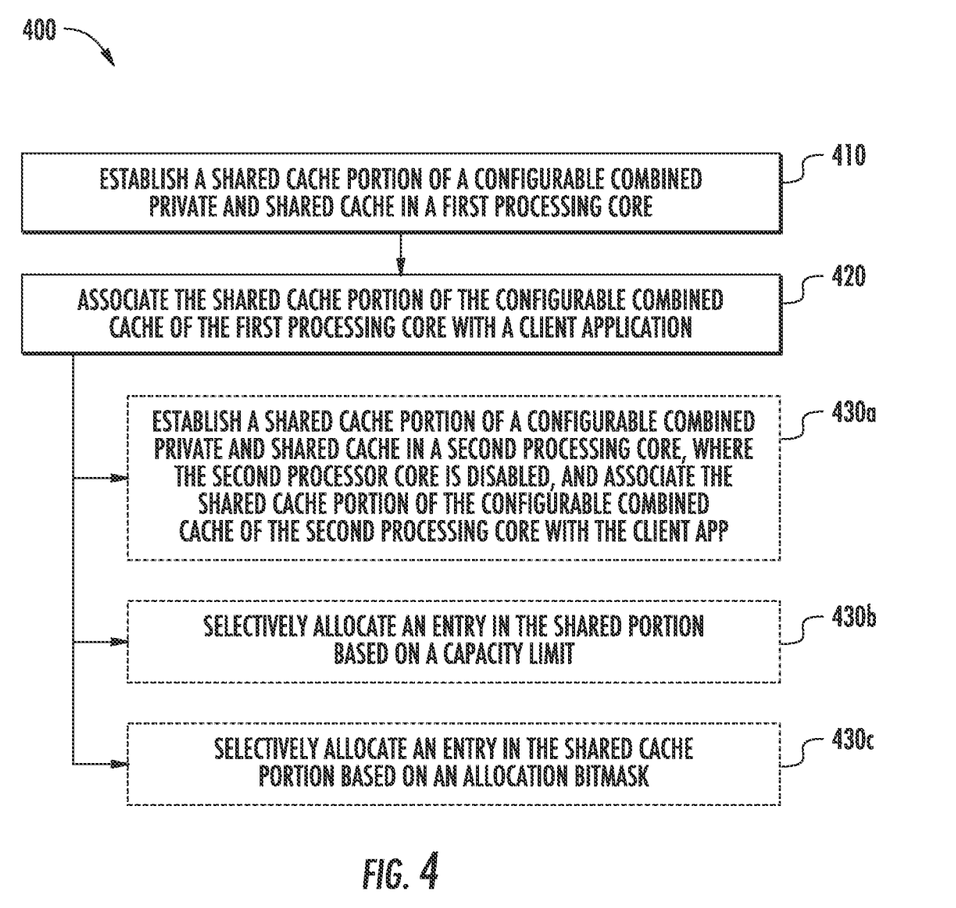
FIG. 4 is a flowchart illustrating exemplary operations for configuring a configurable combined private and shared cache that may be partitionable on a per-core basis in a processor-based system.

FIG. 4 is a block diagram of a method 400 for configuring a configurable combined private and shared cache that may be partitionable on a per-processing core basis as described previously with reference to FIGS. 1-2. The method 400 begins in block 410, by establishing a shared cache portion of a configurable combined private and shared cache in a first processing core. For example, processing core 211a of FIG. 2 may establish four of the available 12 cache ways of its configurable combined private and shared cache as the shared L3 portion. The method 400 then continues in block 420, by associating the shared cache portion of the configurable combined cache of the first processing core with a client application. For example, processing core 211a of FIG. 2 is executing the first virtual machine 281, and the first virtual machine 281 is associated with the shared L3 portion of the configurable combined cache of processing core 211a (meaning that only the first virtual machine 281 is permitted to consume resources in the shared L3 portion of the configurable combined cache of processing core 211a).

The method optionally proceeds to block 430a, by establishing a shared cache portion of a configured combined private and shared cache in a second processor core, where the second processor core is disabled, and associating the shared cache portion of the configurable combined cache of the second processing core with the client application. For example, as described above with reference to the shared L3 portions of disabled processing cores 231b and 231d, those shared L3 portions may be configured to use all twelve (12) cache ways of their respective configurable combined private and shared caches, and may be associated with virtual machines 281, 283, 285, and 287 (meaning that any of virtual machines 281, 283, 285, and 287 may consume resources in the shared L3 portions of disabled processing cores 231b and 231d). In another aspect, the second processing core need not be disabled.

The method 400 optionally proceeds to block 430b, by selectively allocating an entry in the shared L3 portion based on a capacity limit. For example, as described above with reference to the shared L3 portions of disabled processing cores 231b and 231d, if any of the associated virtual machines 281, 283, 285, or 287 exceed the configured capacity limit of one-third, the replacement algorithm for the shared L3 portions of disabled processing cores 231b and 231d may be altered to cause the virtual machine which has exceeded its capacity to perform replacements on entries already associated with that virtual machine. Those having skill in the art will recognize that although block 430b has been described with respect to disabled processing cores 231b and 231d, the same selective allocation may be applied to non-disabled processing cores as well.

The method 400 optionally proceeds to block 430c, by selectively allocating an entry in the shared L3 portion based on an allocation bitmask. For example, as described above with respect to FIGS. 3A and 3B, client ID values may each be associated with a corresponding CR that implements a CLIENT_ALLOC_BITMASK, each of which controls which shared L3 cache portions can be used by the client ID corresponding to that bit mask.

The exemplary processor including a configurable combined private and shared cache structure that may be partitionable on a per-processing core basis according to aspects disclosed herein and discussed with reference to FIGS. 1-4 may be provided in or integrated into any processor-based device. Examples, without limitation, include a server, a computer, a portable computer, a desktop computer, a mobile computing device, a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a wearable-computing device (e.g., a smart watch, a health or fitness tracker, eyewear, etc.), a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 5:
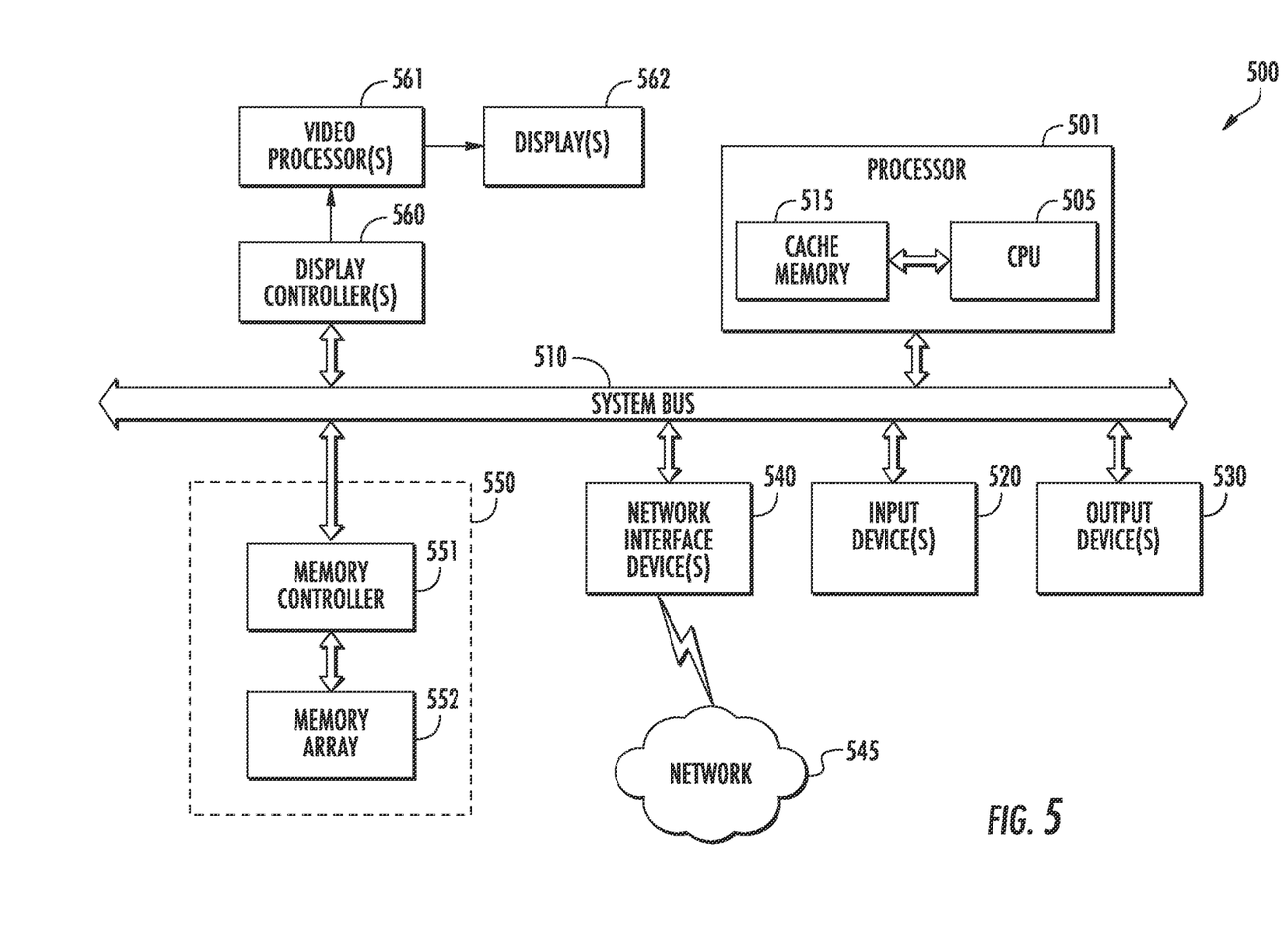
FIG. 5 is a block diagram of an exemplary processor-based system including a processor having a configurable combined private and shared cache that may be partitionable on a per-core basis.

In this regard, FIG. 5 illustrates an example of a processor-based system 500 that includes a configurable combined private and shared cache structure that may be partitionable on a per-processing core basis as illustrated and described with respect to FIGS. 1-4. In this example, the processor-based system 500 includes a processor 501 having one or more central processing units (CPUs) 505, each including one or more processing cores, and which may correspond to the processor 105 of FIG. 1 or the processor 205 of FIG. 2, and as such may include a configurable combined private and shared cache structure that may be partitionable on a per-processing core basis as illustrated and described with respect to FIGS. 1-4. The CPU(s) 505 may be a master device. The CPU(s) 505 is coupled to a system bus 510 and can intercouple master and slave devices included in the processor-based system 500. As is well known, the CPU(s) 505 communicates with these other devices by exchanging address, control, and data information over the system bus 510. For example, the CPU(s) 505 can communicate bus transaction requests to a memory controller 551 as an example of a slave device. Although not illustrated in FIG. 5, multiple system buses 510 could be provided, wherein each system bus 510 constitutes a different fabric.

Other master and slave devices can be connected to the system bus 510. As illustrated in FIG. 5, these devices can include a memory system 550, one or more input devices 520, one or more output devices 530, one or more network interface devices 540, and one or more display controllers 560, as examples. The input device(s) 520 can include any type of input device, including, but not limited to, input keys, switches, voice processors, etc. The output device(s) 530 can include any type of output device, including, but not limited to, audio, video, other visual indicators, etc. The network interface device(s) 540 can be any devices configured to allow exchange of data to and from a network 545. The network 545 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 540 can be configured to support any type of communications protocol desired. The memory system 550 can include the memory controller 551 coupled to one or more memory arrays 552.

The CPU(s) 505 may also be configured to access the display controller(s) 560 over the system bus 510 to control information sent to one or more displays 562. The display controller(s) 560 sends information to the display(s) 562 to be displayed via one or more video processors 561, which process the information to be displayed into a format suitable for the display(s) 562. The display(s) 562 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. A processor-based system, comprising:
a first processing core including a configurable combined private and shared cache, the configurable combined private and shared cache configured to include a shared cache portion,
the shared cache portion configured to be associated with a first client application; and
a second processing core including a configurable combined private and shared cache, the configurable combined private and shared cache of the second processing core comprising a shared cache portion configured to be associated with the first client application.

2. The processor-based system of claim 1, wherein:
the processor-based system further comprises an allocation bitmask corresponding to the first client application; and
the allocation bitmask indicates that the shared cached portion is associated with the first client application.

3. The processor-based system of claim 1, wherein the shared cache portion is configured to be responsive to a replacement policy based on a capacity limit.

4. The processor-based system of claim 1, wherein the second processing core is configured to be disabled.

5. The processor-based system of claim 1, integrated into an integrated circuit (IC).

6. The processor-based system of claim 1, further integrated into a device selected from the group consisting of: a server, a computer, a portable computer, a desktop computer, a mobile computing device, a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a wearable computing device (e.g., a smart watch, a health or fitness tracker, eyewear, etc.), a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

7. A processor-based system comprising a means for processing including means for storing information, the means for storing information configured to include a configurable shared cache portion in a first processing core, the shared cache portion of the first processing core configured to be associated with a first client application, and a configurable shared cache portion in a second processor core, the shared cache portion of the second processing core configured to be associated with the first client application.

8. A method of associating a shared cache portion of a cache, comprising:
    establishing a shared cache portion of a configurable combined private and shared cache in a first processing core;
    associating the shared cache portion of the configurable combined private and shared cache of the first processing core with a first client application;
    establishing a shared cache portion of a configurable combined private and shared cache in a second processing core; and
    associating the shared cache portion of the configurable combined private and shared cache of the second processing core with the first client application.

9. The method of claim 8, wherein associating the shared cache portion of the configurable combined private and shared cache of the first processing core with the first client application comprises setting a value of an allocation bitmask corresponding to the first client application to indicate that the shared cached portion is associated with the first client application.

10. The method of claim 9, further comprising selectively allocating an entry in the shared cache portion based on the allocation bitmask.

11. The method of claim 8, wherein the second processing core is disabled.

12. The method of claim 8, further comprising selectively allocating an entry in the shared cache portion based on a capacity limit.

13. A non-transitory computer-readable medium having stored thereon computer-executable instructions which, when executed by a processor, cause the processor to:
    establish a shared cache portion of a configurable combined private and shared cache in a first processing core;
    associate the shared cache portion of the configurable combined private and shared cache of the first processing core with a first client application;
    establish a shared cache portion of a configurable combined private and shared cache in a second processing core; and
    associate the shared cache portion of the configurable combined private and shared cache of the second processing core with the first client application.

14. The non-transitory computer-readable medium of claim 13, having stored thereon computer-executable instructions which, when executed by a processor, cause the processor to associate the shared cache portion of the configurable combined private and shared cache of the first processing core with the first client application by causing the processor to set a value of an allocation bitmask corresponding to the first client application to indicate that the shared cached portion is associated with the first client application.

15. The non-transitory computer-readable medium of claim 14, having stored thereon computer-executable instructions which, when executed by a processor, further cause the processor to selectively allocate an entry in the shared cache portion based on the allocation bitmask.

16. The non-transitory computer-readable medium of claim 13, wherein the second processing core is disabled.

17. The non-transitory computer-readable medium of claim 13 having stored thereon computer-executable instructions which, when executed by a processor further cause the processor to:
    selectively allocate an entry in the shared cache portion based on a capacity limit.

* * * * *